H. FROM.
FISHING REEL.
APPLICATION FILED JULY 29, 1915.
1,204,856.
Patented Nov. 14, 1916.
2 SHEETS—SHEET 2.
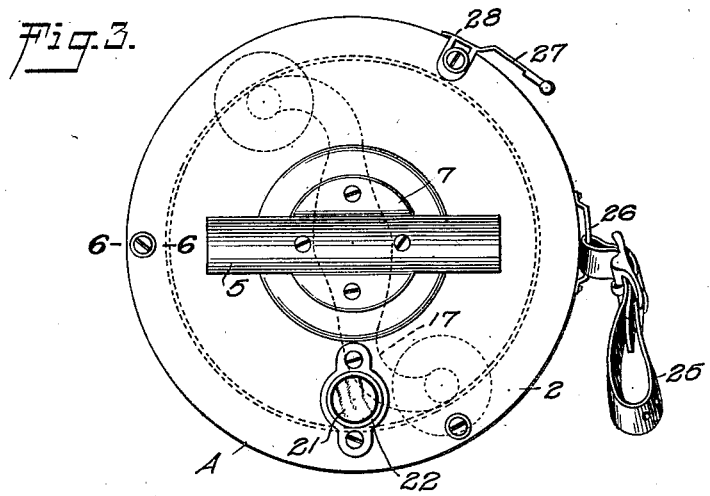
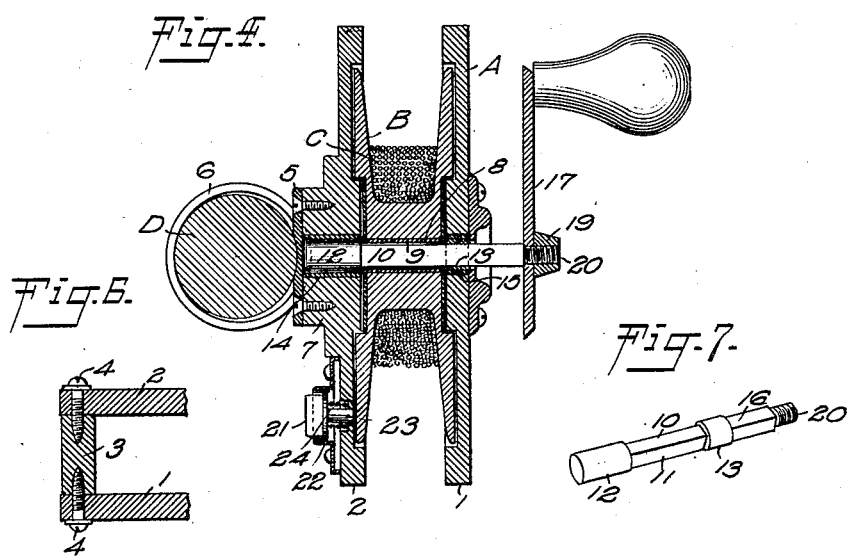
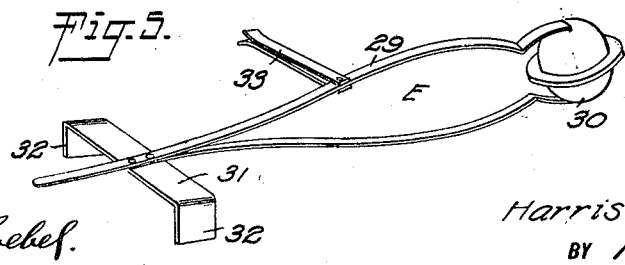
WITNESSES
William P. Goebel.
C. Bradway.
INVENTOR
Harris From
BY
ATTORNEYS

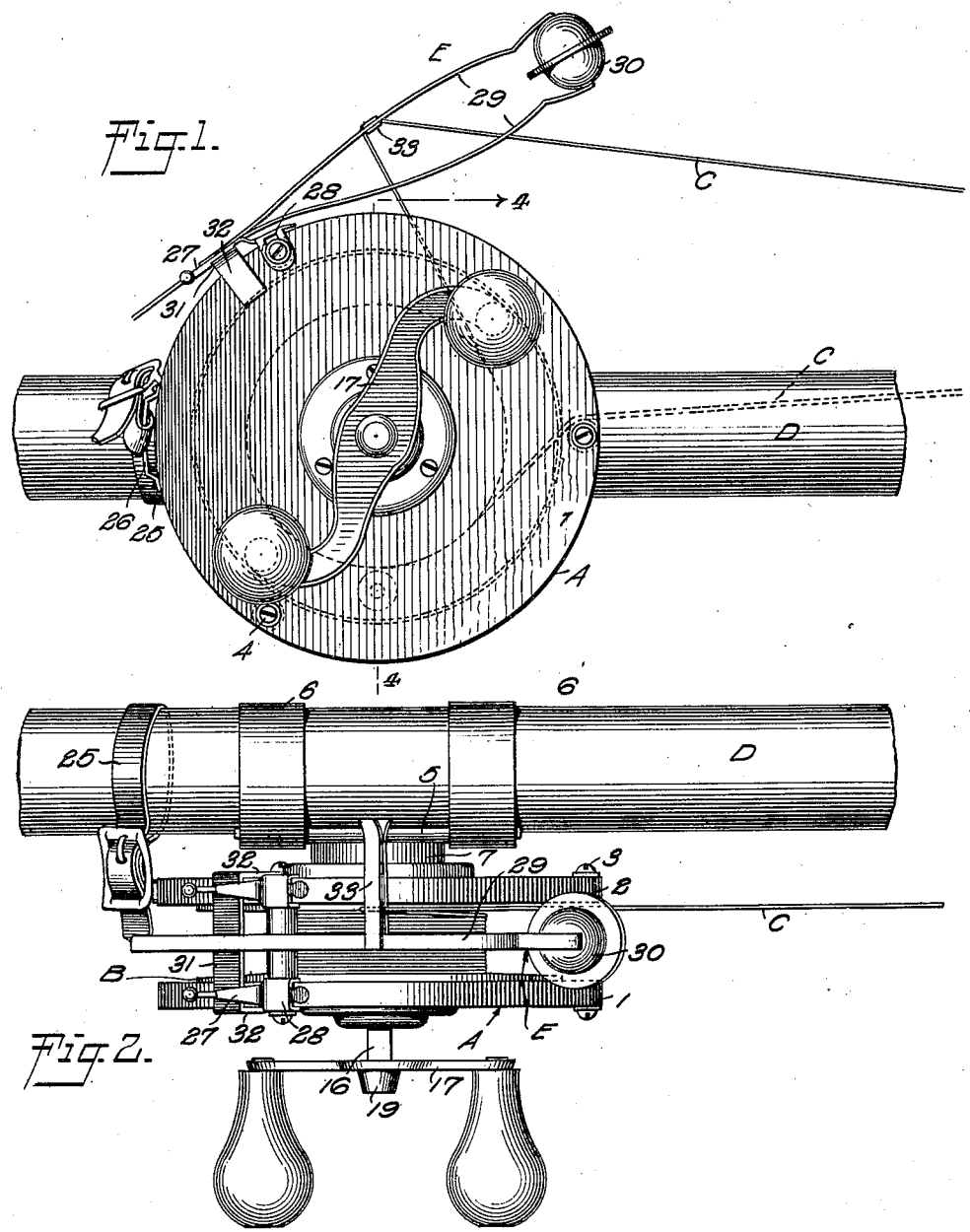

UNITED STATES PATENT OFFICE.

HARRIS FROM, OF NEW YORK, N. Y.

FISHING-REEL.

1,204,856.

Specification of Letters Patent.   Patented Nov. 14, 1916.

Application filed July 29, 1915.   Serial No. 42,488.

*To all whom it may concern:*

Be it known that I, HARRIS FROM, a citizen of the United States, and a resident of the city of New York, borough of the Bronx, in the county of the Bronx and State of New York, have invented a new and Improved Fishing-Reel, of which the following is a full, clear, and exact description.

This invention relates to fishing reels and has for its general objects to improve and simplify the construction of devices of this character so as to be reliable and efficient in use, comparatively inexpensive to manufacture, and of durable and substantial design.

A more specific object of the invention is the provision of a fishing reel in which the winding wheel is mounted in a cage or frame of novel construction which has fixedly secured thereto at one side a bracket whereby the reel is fastened to a fishing rod, said cage or frame having clips fastened thereto for removably holding a signal device, the frame also having a loop forming a safety device whereby the fishing reel can be held on the fishing rod even in the event of the rings on the latter disengaging from the bracket of the reel.

Still another object of the invention is the provision of a novel brake so positioned that it can be conveniently and quickly operated for stopping the unwinding of the reel.

Still another object of the invention is to provide a simple, inexpensive and novel signal device which is applied to the reel to indicate that a fish is biting.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a side view of the reel; Fig. 2 is a plan view of the reel; Fig. 3 is a view taken from the opposite side of the reel from that shown in Fig. 1, the reel being detached from the fishing rod and the signal device being removed; Fig. 4 is a sectional view on the line 4—4, Fig. 1; Fig. 5 is a perspective view of the signal device; Fig. 6 is a detail sectional view on the line 6—6, Fig. 3; and Fig. 7 is a perspective view of the shaft of the reel.

Referring to the drawing, A designates the frame or cage of the reel in which is disposed the wheel B that carries the fish line C. The frame A comprises two spaced disks 1 and 2 which are held in spaced relation by interposed spacers 3 arranged at three or more points adjacent the periphery of the disks, and screws or equivalent fasteners 4 pass through the disks and screw into the spaces, as clearly shown in Fig. 6. This circular frame has at one side secured thereto a bracket 5 which is a curved bar parallel with the plane of the reel frame and adapted to fit the fish rod D to which the reel is applied, such fish rod having the usual bands 6 for securing the reel in place. The bracket 5 is fastened to the disk 2 of the frame A and it is disposed at the hub 7 thereof, with the length of the bracket diametrically disposed.

The reel B is a circumferentially grooved body of wood or other material and has a square tube forming shaft opening 8 at the center which may be provided with a metal lining 9. Through the reel or wheel B extends a shaft 10 which may be constructed as shown in Fig. 7, the shaft having a squared or non-circular portion 11 which fits the correspondingly shaped metal lined opening 8 in the reel, and at the ends of the squared portion 11 are soldered circular bearing portions or rings 12 and 13 which engage respectively in bearing openings in the disks 1 and 2. If these disks are made of wood the bearing openings are preferably provided with bushings or linings 14 and 15 for the bearing portions 12 and 13 of the shaft. The shaft extends out of the side of the frame A opposite from that having the bracket 5, and on the outer squared end 16 of the shaft is an operating double arm crank 17 held in place by a nut 19 screwed on the stud portion 20 of the shaft. The bearing portions 12 and 13 are of larger diameter than the squared portion 11, so that the shaft cannot move longitudinally in the reel, but is free to rotate.

In order to stop the unwinding of the wheel B a brake device is employed. This brake device comprises a push button 21 mounted in a housing or guide 22 fastened to the outer face of the disk 2, the pushbutton being provided with a stem 23 which passes inwardly through an opening in the disk 2, and is adapted to engage the side of the wheel B, so as to prevent rotation thereof. Normally the pushbutton is held out of engagement with the wheel B by a spring 24. This brake is located at the side of the device opposite from the operating crank 17, so that it is always conveniently accessible for operation, and being located at the bottom of the reel, as shown, it can be conveniently manipulated by the left hand while the right hand holds the fishing rod.

It is desirable to provide a safety device so as to prevent the fishing reel from dropping off the rod in case the band 6 should become loose. For this purpose is employed a loop such as a leather strap 25 which is fastened to the disk 2 by any suitable device. The strap or loop 25 is passed around the fishing rod D, as shown in Fig. 2.

Fastened to the top of the reel frame and projecting rearwardly therefrom are spring clips 27 having their base portions 28 suitably fastened to the disks 1 and 2, with the clip portions overlying the peripheries of such disks. By means of these clips a signal device E is fastened to the reel. This device consists of an arm 29 of any suitable form which has a bell 30 on its free end, the arm being fastened to a cross bar 31 which bridges the frame A from one disk thereof to the other and engages under the clips 27, lateral movement of the device E being prevented by the cross bar having its ends 32 bent downwardly into lugs to engage outside the disks 1 and 2 of the frame. On the arm 29 are normally closed spring jaws 33 between which the fish line C is engaged when fishing, so that a fish in taking the bait will cause the signal to be sounded.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A fishing reel comprising a frame, a fish line carrying wheel mounted in the frame, spaced clips secured to the periphery of the frame and lying outwardly from the periphery of the wheel, and a signal device held on the frame by the clips and having spring jaws for receiving a fish line for indicating when a fish bites.

2. A fishing reel comprising a frame consisting of spaced disks rigidly connected together, a fish line carrying wheel rotatably mounted between the disks, clips fastened to the peripheries of the disks and extending in the same direction, a signal for indicating when a fish bites, said signal including an arm having a cross bar detachably engageable in the clips, and the ends of the bar being bent downwardly to engage the outer faces of the disks, and spring jaws on the arm for holding the fish line.

3. A fishing reel comprising a supporting structure, a wheel rotatably mounted therein, and a push-button mounted on the supporting structure and movable substantially parallel with the axis of the wheel and adapted to be held in engagement with the wheel only by the finger being pressed against the button, said button being provided with spring means for holding it disengaged from the wheel.

In testimony whereof I have signed my name to this specification in the presence of two subscribing witnesses.

HARRIS FROM.

Witnesses:
C. BRODWAY.
PHILIP D. ROLLHAUS.